United States Patent [19]

Swanson

[11] 4,368,379
[45] Jan. 11, 1983

[54] TOASTER HAVING TOASTING CONTROL FOR CONVENIENCE FOODS

[75] Inventor: Charles E. Swanson, Chicago, Ill.

[73] Assignee: Sunbeam Corporation, Chicago, Ill.

[21] Appl. No.: 150,544

[22] Filed: Jun. 7, 1971

[51] Int. Cl.³ .............................................. H05B 1/02
[52] U.S. Cl. ................................................... 219/494
[58] Field of Search ............ 99/329 R, 333; 338/217, 338/218; 337/360, 361; 219/19.01, 19.1, 19.02, 476, 480, 483, 484, 485, 486, 487, 489, 494, 507, 508, 510, 521

[56] References Cited

U.S. PATENT DOCUMENTS

| | | | |
|---|---|---|---|
| 2,271,485 | 1/1942 | Kocl ................................. | 99/329 R |
| 2,493,542 | 1/1950 | McGraw .......................... | 338/218 X |
| 2,595,283 | 5/1952 | Mueller ........................... | 219/483 X |
| 2,611,849 | 9/1952 | Gough ............................ | 219/510 X |
| 2,806,924 | 9/1957 | Olson ............................. | 337/360 X |
| 2,952,760 | 9/1960 | Kircher ........................... | 337/361 |
| 3,361,053 | 1/1968 | Jepson et al. .................... | 99/329 R |
| 3,509,321 | 4/1970 | Kimura et al. ................... | 99/329 R |
| 3,585,363 | 6/1971 | Price ............................... | 219/494 |

Primary Examiner—Roy N. Envall, Jr.
Attorney, Agent, or Firm—George R. Clark; Neil M. Rose; Clifford A. Dean

[57] ABSTRACT

An electric toaster is provided which may be used for either bread slices or convenience foods. A first control lever for varying the setting of the control means of the toaster is employed to provide for light and dark toasted bread. A second control lever is employed when convenience foods are being heated to open a pair of switch contacts which reduce the power level of the toaster. The second control lever is linked to the first control lever in such a manner that the control means is adjustable over a reduced range when the power level of the toaster is reduced.

11 Claims, 9 Drawing Figures

TOASTER HAVING TOASTING CONTROL FOR CONVENIENCE FOODS

BACKGROUND OF THE INVENTION

The present invention relates generally to electric toasters and, more particularly, to electric toasters of the semi-automatic or automatic type wherein the time interval during which the bread is toasted is selectively and automatically controlled to provide for repeated uniform toasting action of bread slices or of convenience foods which are placed in the toaster.

It is desirable in a toaster to provide automatic means for controlling the toasting cycle, which means automatically compensate for the ambient temperatures within the toaster in order to provide uniform toasting for successive bread slices. The toaster of the Jepson et al U.S. Pat. No. 3,361,053, issued on Jan. 2, 1968 to the assignee of the present application, discloses a toaster which has a radiation sensitive means for providing such compensation. Convenience foods which include frozen foods such as waffles, filled tarts, toasted pizza, french toast, muffins, cinnamon sticks, corn bread, etc. are becoming increasingly popular, and it is highly desirable to provide a toaster which toasts these to the proper degree of toasting so that they are as tasty as possible. These foods are generally stored in a freezer or refrigerator, and if they are directly inserted into a toaster which is suitable for toasting bread, the wattage output of the toaster, and the consequent amount of higher wavelength radiation that is present, will be much greater than is optimum for these foods and they will become overcooked and dried out on the outside but they will not be sufficiently cooked on the inside. In addition, it has been found that, while some adjustment for the heating or toasting of convenience foods is required, according to whether or not they are frozen, refrigerated or at room temperature when they are inserted into the toaster, the range of adjustment which is necessary for the automatic toasting of convenience foods with the disclosed toaster is less than that required for the automatic toasting of bread.

It is, therefore, an object of the present invention to provide a relatively simple control means which limits the toasting range of an automatic toaster and which reduces the wattage output of the toaster when convenience foods are to be toasted.

It is another object of the present invention to provide a mechanism for an automatic bread toaster so that the toaster may alternately be operated as a convenience food heater or toaster wherein the toaster preferably provides substantially uniform heating for the object being heated or toasted regardless of whether the object is a slice of bread or a convenience food.

Other objects and advantages of the present invention will be apparent to those skilled in the art from the following description.

TECHNICAL DESCRIPTION OF THE INVENTION

In the toaster of the present invention, the toasting control means is constructed so the toaster is supplied with a high wattage for toasting bread. A toasting range control level is incorporated in the toaster so that the toasting range of the toaster may be adjusted. In addition, the toaster of the present invention includes a convenience foods control mechanism which interlocks with the toasting range control lever and functions to limit the maximum adjustment range of the toaster when a convenience food is being toasted and at the same time opens a pair of switch contacts which reduce the power level of the toaster.

There is illustrated in the drawings a new and improved electric toaster which is referred to generally by the reference numeral 20. The toaster 20 includes an outer enclosure or housing defined by a pair of opposite end panels 22 and 23, an outer shell 24 of U-shaped cross section and a base member 28. The shell 24 comprises a top panel 24a and a pair of side panels 24b and 24c.

The top panel 24a of the shell 24 is provided with a pair of spaced elongated bread receiving slots 26 and 27 which define the entrances to a pair of toasting chambers 29 and 30 (FIG. 2) within the housing of the toaster 20 whereby bread slices may be selectively inserted into the toasting chambers 29 and 30 for toasting. Each of the toasting chambers 29 and 30 is provided with spaced-apart upstanding heating units 31 which define opposite sides of the chambers 29 and 30. The pairs of heating units 31 are supported on the base member 28 in a manner described hereinafter, and the upper ends of the units are secured in proper spaced-apart relation to one another by engagement with depending flanges on the top panel 24a of the shell 24, a feature which will be described more fully hereinafter. The base 28 is illustrated as a somewhat U-shaped integral metal stamping with support flanges projecting from the legs of the U. As illustrated, it comprises a raised horizontal central portion defined by spaced elongated heating unit support members 28a (FIG. 3) which are connected at the control end of the toaster to a vertical portion 28d (FIG. 2) and at the other end to a similar vertical portion 28e. Projecting from the lower end of the vertical portions 28d and 28e are horizontal support flanges 28f and 28g, respectively.

The end panels 22 and 23 are preferably constructed of molded plastic material such as phenolic resin or the like and are provided with lower depending portions 22a and 23a, respectively, defining legs for supporting the toaster from a table or counter top. The outer faces of the end panels 22 and 23 may be provided with integrally molded decorative features such as outwardly projecting flanges 22b and 23b, respectively, (FIGS. 1 and 3) which define a sort of rectangular frame to house a decorative escutcheon plate of brushed aluminum or the like which may be mounted against the outer face of the end panel 22. As illustrated, the control end of panel 22 is provided with an escutcheon plate 33. Preferably, the escutcheon plate 33 is provided with tabs which extend to openings in the panel 22 to secure the plate 33 in position. The outwardly extending handles 22g and 23g are integrally formed with the end plates 22 and 23, respectively. The handles 22g and 23g are insulated and may be used for transporting the toaster.

In order to permit suitable controls to extend therethrough, the control end panel 22 and escutcheon plate 33 are provided with aligned openings defining vertically extending central slot 35 (FIGS. 1 and 3) for accommodating vertical movements of the actuating arm of a carriage control mechanism of the toaster which is described in detail hereinafter. The panel 22 and escutcheon plate 33 are also provided with aligned openings defining a horizontally disposed slot 36 for accommodating the horizontal movements of a selector arm of a color control mechanism for the toaster 20 and a second horizontally disposed slot 36a for accommodating the horizontal movements of a control lever that is employed when convenience foods are being toasted, also described hereinafter. So that the particular setting of the color control mechanism is apparent to the user, the escutcheon plate 33 on the end panel 22 is provided with appropriate indicia such as the word "LIGHT" at one end of the slot 36, the word "DARK" at the other end of this slot and suitable numbers or the like to indicate the various gradations disposed along this slot.

The portion of the indicia between the end marked with the word "LIGHT" and the central vertical slot 55 is provided with one group of indicia which is to be employed when convenience foods are being toasted and another readily distinguishable group of indicia which is to be employed when bread is being toasted. The second indicia group is preferably divided into a number of ranges which may be labelled with the letters "A, B, C and etc." or with numbers such as "I, II, III and etc." The various ranges show the appropriate setting for the selector and of the color control mechanism for the toaster when convenience foods of various initial temperatures are being toasted. For example, the "A" position at the "LIGHT" end of the first indicia group corresponds to the toasting range for convenience foods that are at room temperature. The "B" position of the selector arm for the color control mechanism is halfway between the "LIGHT" and the central slot 35, and it indicates the position of the selector arm when convenience foods which are cool because of storage in a refrigerator are being toasted. The "C" position at the middle of the first indicia group range which is located approximately at the central vertical slot 35 indicates the position for the selector arm of the color control mechanism when convenience foods that are fozen are being toasted.

The upper portion of the handle 22g is provided with an escutcheon plate 33c. The escutcheon plate 33c is divided into a left-hand section and into a right-hand section. The escutcheon plate 33c is provided with suitable instructions so that the control lever 208 is positioned under the right-hand section when bread is being toasted and is positioned under the left-hand section when convenience foods are inserted into the toaster. When the convenience food control lever 208 is positioned under the left-hand section of the escutcheon plate 33c, the selector control lever 89 for the color control mechanism is adjustable only over one half of its entire range between the "LIGHT" mark to the center slot 35. On the other hand, when the convenience food control lever 208 is positioned under the right-hand section of the indicia plate 33c, the color control lever 89 for the selector mechanism of the toaster is adjustable over the entire range from the "LIGHT" to the "DARK" markers. Movement of the control lever 208 for convenience foods under the left-hand section of the indicia plate 33c not only limits the range of adjustment of the control lever 89 for the color control mechanism but also electrically controls a switch 104 (FIGS. 4 and 5) which reduces the wattage output of the toaster when convenience foods are being toasted. Reduction of the wattage output of the toaster results in proportionally more convection heating than radiation heating and correspondingly an increased "baking" action for heating the interior of the convenience food.

For the purpose of supporting the base member 28 and to insure ease of assembly and disassembly, the end panels 22 and 23 are formed with integrally formed, inwardly directed base support flanges 22c and 23c, respectively, which are provided with suitable openings to receive fastening means for securing the base 28 and the shell 24 to these end panels. The support flanges 28f and 28g of the base member 28 are supported on the flanges 22c and 23c, respectively. To secure the shell 24 to the base 28, the side panels 24b and 24c thereof are provided with inturned lower edge flanges 24d and 24e, respectively, (FIG. 2) which are disposed to confront lower surfaces of the base support flanges 22c and 23c of the respective end panels 22 and 23. Suitable fastening means such as self-tapping screws 37 are provided at each corner of the toaster 20 to secure the base support flanges 22c and 23c of the end panels 22 and 23, the support flanges 28f and 28g of the base member 28 and the flanges 24d and 24e of the shell 24 to form the base and housing assembly of the toaster 20. Thus, by simply removing the four screws 37 and deflecting the lower edges of the side panels 24b and 24c of shell 24 outwardly, the latter can be removed from the end panels and base member to expose the internal mechanism of the toaster 20.

Figure 2:
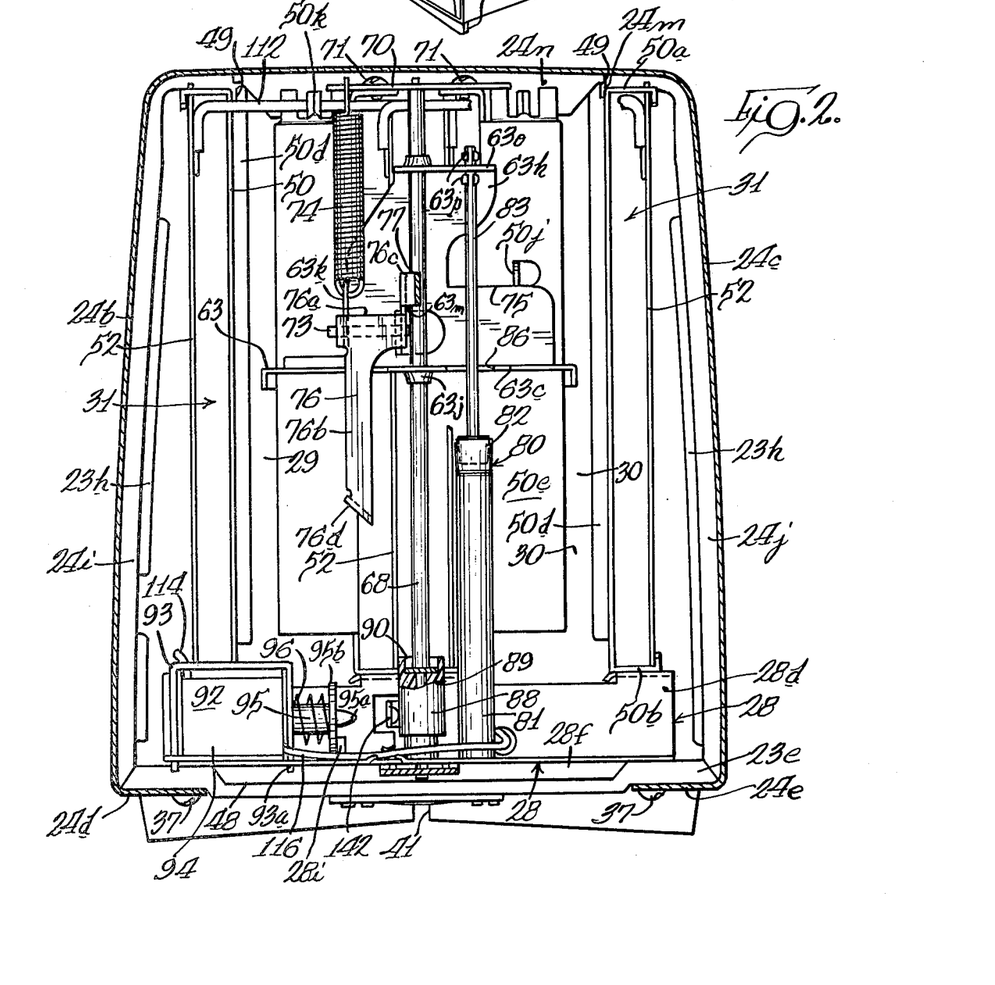
FIG. 2 is a side elevational sectional view of the toaster of FIG. 1 taken substantially along the line 2—2 of FIG. 1 but with certain portions cut away to more clearly illustrate the invention.
Figure 3:
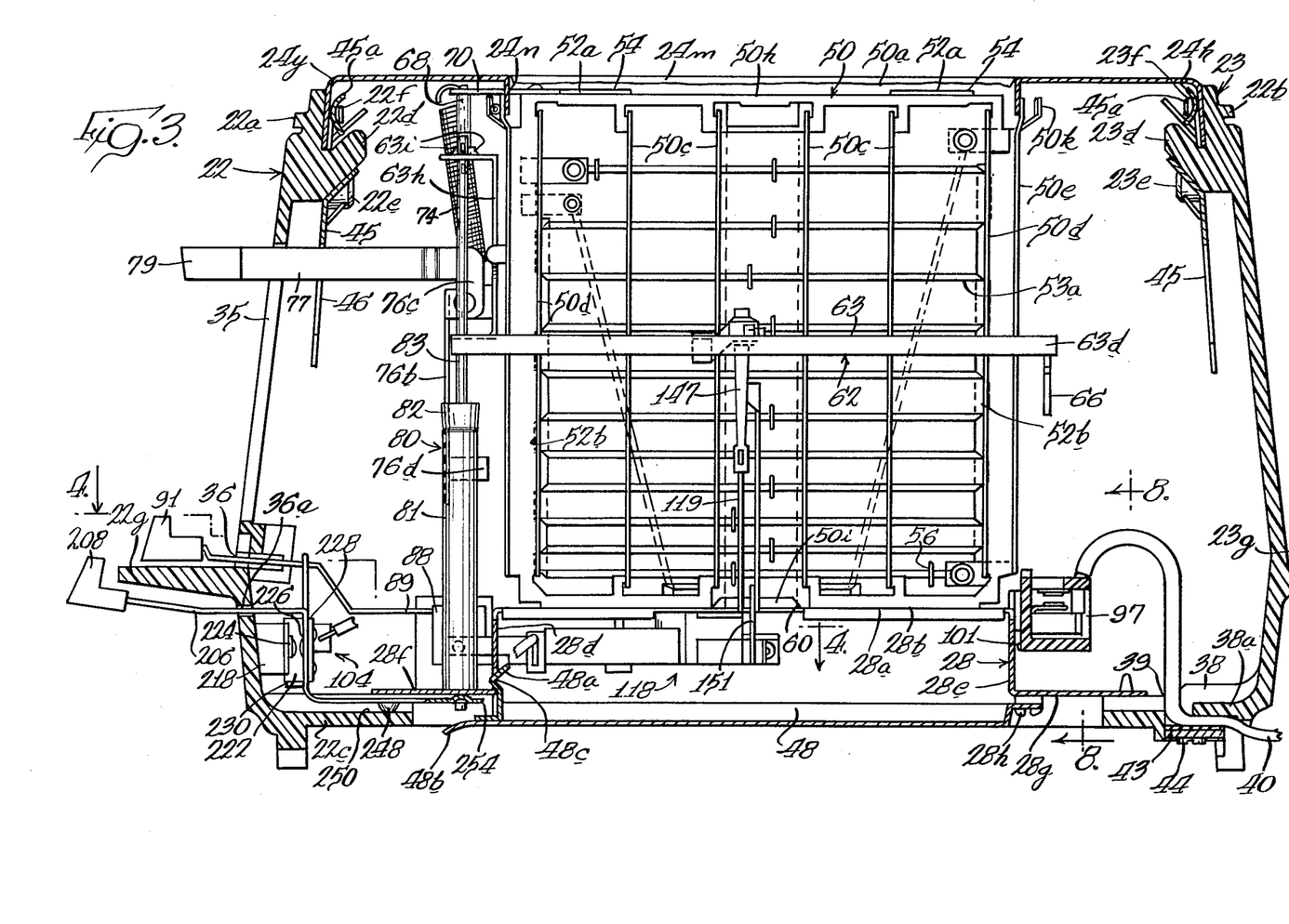
FIG. 3 is a transverse sectional elevational view of the toaster of FIG. 1 taken substantially along the line 3—3 of FIG. 2, assuming that FIG. 2 shows the complete structure.

In order to accommodate a suitable power cord for supplying electrical energy to the toaster as well as a strain relief for such cord, the underside of the base support flange 23c of the end panel 23 is provided with a centrally disposed downwardly opening recess 38 (FIG. 3) which is provided with an opening 39 through which a conventional power cord 40 may pass. The leg portion 23a of panel 23 is provided with a cord receiving notch 41 (FIGS. 2 and 3). Thus, power cord 40 may extend from outside end panel 23 through notch 41 into recess 38 and thence through opening 39 to the space within the toaster housing above the base 28. In order to prevent the exertion of an excessive strain on the terminals of the toaster 20, there is provided a strain relief means comprising a clamping member 43 receivable in recess 38 to clamp the power cord 40 against the top wall defining recess 38. Suitable screws 44 are provided to secure the clamping member 43 in its clamping position. Preferably a step or shoulder 38a (FIG. 3) is provided against which cord 40 is clamped.

For the purpose of interlocking the upper portions of the shell 24 and end panels 22 and 23 to form a strong, rigid housing for the toaster and also to shield these molded end panels, a pair of identical clip members 45 (FIG. 3) are provided, one secured to the inside face of each of the respective end panels 22 and 23. The clip members 45 are jam-mounted in their proper positions on projecting pairs of bosses 22e and 23e integrally formed with the respective end panels 22 and 23. The bosses are disposed to project through appropriately aligned jam-nut type openings formed in the clip members 45 when the clip members are positioned in place on the end panels. Each of the clip members is provided with a central notch 46 in the lower edge thereof so that, if associated with control end panel 22, it will be aligned with the vertical slot 35.

The clip members 45 are formed with upwardly extending inwardly deflectable resilient fingers 45a for engaging down-turned centrally disposed end flanges 24g and 24h formed at opposite ends of the top panel 24a of the shell 24. The end panels 22 and 23 are also provided with an integral boss 22d and 23d, respectively, to provide limit stops for the resilient fingers 45a. For proper orientation of the shell, as described hereinafter, the flange 24g at the control end is substantially wider than the flange 24h at the other end. The flanges 24g and 24h are adapted for engagement between the inner faces of the end panels 22 and 23 and the adjacent fingers 45a of the respective clip member 45 when the shell is in an assembled position thus locking together the upper portions of the shell and the end panels. Additionally, spaced-apart pairs of orientation bosses 22f and 23f are provided near the top of the inner faces of the respective end panels 22 and 23 for insuring proper orientation of shell 24. The bosses 22f are spaced farther apart than the bosses 23f, and the wide flange 24g cannot be accommodated between bosses 23f thus assuring proper orientation of shell 24. This orientation is necessary since, preferably, indicia are provided on the shell to indicate which toasting chamber 29 or 30 is to be used when only a single slice is to be toasted, and as will become apparent from the ensuing description, the thermostatic control means responds to the condition of only one slice of bread, namely that in toasting chamber 30.

To provide further strength for the assembled housing for the toaster 20, the side panels 24b and 24c of the shell 24 are provided with vertically extending inturned end flanges 24i and 24j, respectively, (FIG. 2). The flanges 24i and 24j are adapted to bear against the inner faces of the end panels 22 and 23 and against suitable shoulders defined by inwardly extending ribs 22h and 23h, respectively (23h shown in FIG. 2), integrally formed with the end panels 22 and 23 for preventing inward lateral movement of the side panels 24b and 24c relative to the end panels 22 and 23 after the shell 24 is in place.

It can thus be seen from the foregoing description that the end panels 22 and 23, base member 28 and shell 24 are easily assembled together to form a strong external housing for the toaster 20 which is neat in appearance. The shell 24 is easily interlocked into position between the end panels 22 and 23, and, when disassembly is desired, only the screws 37 need be removed before the shell can be separated from the end panels. Moreover, the shell cannot be assembled with the end panels when not correctly orientated, and thus any possibility of improper assembly is precluded. Once the shell 24 has been removed from the end panels 22 and 23, the panels 22 and 23 can easily be separated from the base member 28 if desired.

Considering the base member 28 in more detail, the spaced parallel elongated heating unit support members 28a support the pairs of upstanding heating units 31. As illustrated, the member 28a has downturned edges so as to be somewhat channel shaped for increased rigidity, and it supports two centrally disposed, upstanding heating units 31 in back-to-back relationship. The outer heating unit support members 28a also have an edge flange for increased rigidity, and they each support one of the outer heating units 31. The spaces between the heating unit support members 28a are disposed directly beneath the toasting chambers 29 and 30.

In order to receive crumbs and toasted particles which may fall from the bread slices or from the convenience foods placed in the toasting chambers 29 and 30, there is provided a removable crumb tray 48 which is disposed to underlie the raised central section of the base member 28 defined by spaced heating support members 28a. The crumb tray 48 is pivotally attached at one end to the end flange 28g of the base member 28 by means of depending hinge lugs 28h (FIG. 3). The hinge lugs 28h are provided with upwardly extending slots having enlarged circular blind ends into which trunnion portions integral with the crumb tray 48 are first inserted when the tray is parallel to the longitudinal axis of the slots, after which the crumb tray 48 may be pivoted to the closed position as shown in FIG. 3 underlying the base member 28. The mounting means for the crumb tray are more fully disclosed and claimed in U.S. Pat. No. 3,256,805 which issued June 21, 1966 in the name of the present inventor, which patent is assigned to the same assignee as in the instant application. The other end of the crumb tray 48 is provided with an upstanding spring latch finger 48a attached to a forwardly extending handle or tab 48b, the latter being utilized to grasp the forward portion of the crumb tray 48 to move it downwardly to unlatch the spring finger 48a and to remove the tray, if desired, for emptying. The latch finger 48a is engageable with the lower edge of a suitable opening 48c provided in the vertical section 28d of the base member 28 when the tray 48 is latched in the closed position as shown in FIG. 3 of the drawings. Preferably, the crumb tray 48 is provided with suitable ventilating openings (not shown).

The heating units 31 which define the opposed side walls of the toasting chambers 29 and 30 are similar. Accordingly, the corresponding parts which are similar will be designated by the same reference numerals and only one heating unit 31 will be described in detail.

Figures 7, 8, 9:
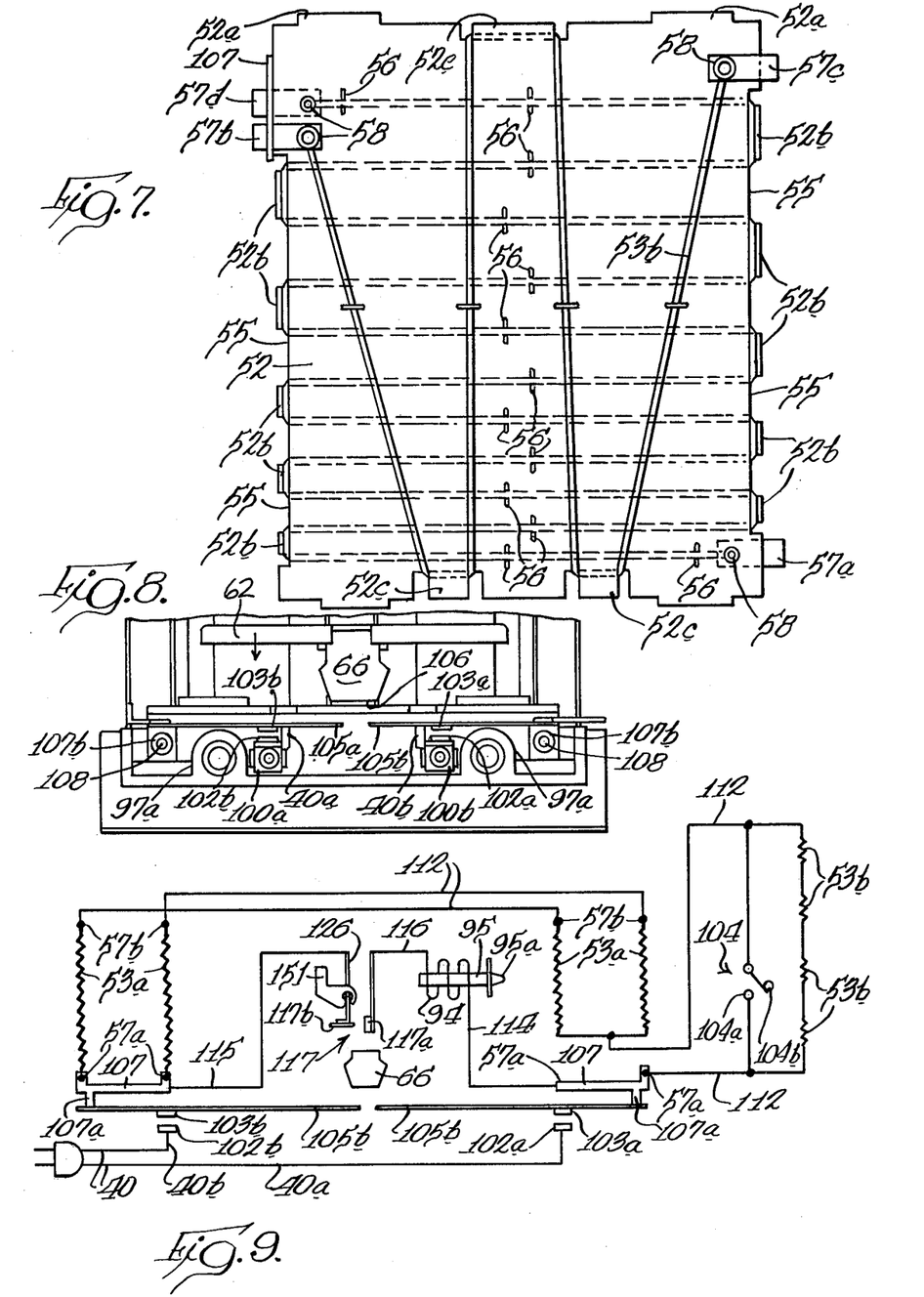
FIG. 7 is a partial elevational view of the back side of one of the heating elements employed in the toaster of FIG. 1.
FIG. 8 is a fragmentary sectional view taken along the line 8—8 of FIG. 3, assuming that FIG. 3 shows the complete structure with the bread carriage near its lower toasting position, to illustrate the switches for controlling the current to the heating elements.
FIG. 9 is a schematic diagram illustrating the electrical circuit of the toaster of FIG. 1.

A side elevational view of the heating side of the heating unit 31 is shown in FIG. 3 and the back of the heating unit 31 is shown in FIG. 7. Each heating unit includes a rectangular frame 50 with a continuous periphery and a plurality of spaced parallel cross members, all of which are formed as a single sheet metal stamping. Each frame 50 comprises a horizontally disposed top member 50a and a bottom member 50b. In an embodiment built in accordance with the present invention, the top and bottom members comprised a flat strip of sheet metal of the order of one-half inch in width disposed in a horizontal plane, with a downturned edge on top member 50a and an upturned edge on bottom member 50b on the heating sides thereof interconnected by a plurality of integral spaced parallel connecting members or ribs 50c and 50d defining bread guides. The end bread guides are designated as 50d, and for the outer heating units 31 are of L-shaped cross section to provide increased rigidity since they function both as the frame edge and as bread guides. The bread guides 50c, on the other hand, are narrow, relatively thin metal strips with the plane of the strips perpendicular to the surface of the bread slice, as best shown in FIG. 3 of the drawings. The integral construction of ribs 50c and 50d with the remainder of frame 50 eliminates the need for separate guide wires and additionally adds to the overall strength of the frame. In the case of the center heating units 31, the end bread guides 50d are provided with an L-shaped extension (not shown) for providing projecting lateral flanges defining carriage guides at each corner of the back-to-back center heating elements, the detailed function of which is described in greater detail hereinafter. For purposes described hereinafter, the ribs 50d and at least some of the ribs 50c project slightly above the junction with top frame 50a and are provided with notches or locking recesses 49, best shown in FIG. 2 of the drawings.

The frames 50 of each heating unit 31 are adapted to support an associated insulating member 52 which, in turn, supports an electric heating element 53. As illustrated, insulating member 52 is a mica sheet having upper and lower spaced projecting tabs 52a receivable in cooperating notches 54 defined in the back edges of both the top and bottom frame members 50a and 50b. To hold the insulating sheet 52 in assembled relationship with the frame 50, the latter is preferably provided with bend tabs (not shown) at the edges of the notches 54, which, of course, retain the insulating members 52 in position. The side edges of each insulating sheet 52 are provided with projections 52b defining a plurality of notches 55, some wide and some narrow, to permit electrical heating elements 53 to be supported thereon in the desired configuration. In an embodiment built in accordance with the present invention, the electric heating element 53 of each heating unit 31 comprised a resistance wire in ribbon form which, starting from the top by way of example and particularly with reference to the FIGS. 3 and 7 of the drawings, extends across the heating side of the associated heating unit, then around the uppermost projection 52b, back across the other side, around the projection 52b on that edge, and then back and forth until the bottom of the sheet is reached thereby providing a plurality of parallel lengths of ribbon resistance element across the heating side of insulating member 52. For uniform heating of the bread slices being toasted in toaster 20, the spacing between the lengths of resistance wire 53 extending across the sheet 52 decreases going from top to bottom as clearly shown in FIGS. 3 and 7 of the drawings. The resistance wire is effectively zig-zagged back and forth across the sheet. To support the ribbon wire 53 at intermediate portions thereof and at the ends to prevent sagging, preferably a plurality of staples 56 or other fastening means are employed to clamp the same to the sheet 52.

The ends of the heating element 53 are connected to suitable electric terminals 57a, 57b, 57c and 57d. The electric terminals 57a, 57b, 57c and 57d are mechanically supported to the insulating member by suitable eyelet fastening means 58. The terminals 57a and 57b are on opposite sides of the insulating sheets 52 and are disposed so that one is near the bottom of the sheet and the other is near the top of the sheet. As specifically illustrated, the terminals 57a are disposed near the bottom of each heating element, while the terminals 57b are disposed near the top of each insulating sheet 52. These terminals 57a and 57b are conductive strips projecting from the edges of sheet 52 parallel to the plane of the sheet. The terminals 57a and 57d are connected to the ends of the parallel resistance wire 53a which runs back and forth in the zig-zagged pattern across the heating side of the insulating sheet 52. The terminals 57c and 57b are both secured to the rear side of the insulating sheet 52. They are connected to the ends of the electrical resistance wire 53b which runs from the terminal 57b at an oblique angle and around the projecting tab 52c which is formed on the bottom of the insulating sheet 52. The resistance heating wire 53b then runs in a vertical direction normal to the direction of the resistance heating wire 53a and around projection tab 52c on the top of the insulating sheet 52. The wire 53b then continues in its path downwardly, around the other projecting tab 52c on the bottom of the sheet 52, and then upwardly at an oblique angle to the electrical terminal 57c. Electrical current may, therefore, be supplied individually through the resistance wire elements 53a and 53b by connection of a source of current to the pairs of terminals 57a, 57d and 57b, 57c, respectively. The resistance element wire 53b is shorter in length than is resistance element wire 53a, and it has less resistance than does the wire 53a. The resistance element wire 53b which has two strands running in a direction normal to the resistance wire 53a and two strands running obliquely downwards towards the notches 52c, as described, thereby provides uniform heating when either the resistance wire 53a or both of the resistance wires 53a and 53b are supplied with current.

For the purpose of securing the heating units 31 to the base 38 in spaced parallel relationship to define the toasting chambers 29 and 30, the bottom frame members 50b of each heating unit are provided with bend tabs (not shown) receivable in cooperating openings defined in the base 28. For accurate positioning of the center heating elements 31, particularly where adjacent the radiant temperature responsive device described hereinafter, it is desirable that the center portion of the associated insulating sheet 52 be held in a predetermined horizontal position relative to the associated toasting chamber. To this end, the upper frame member 50a for this particular unit, as best shown in FIG. 3 of the drawings, is provided with a downwardly extending boss 50h providing a shoulder against which the upper portion of the face or sheet 52 engages. Similarly, to support the lower center portion and to engage the face thereof, an upwardly directed flange 50i is provided surrounding a recess 60 defined in both the lower frame member 50b of this heating unit and the base portion 28b, the purpose of which notch or recess 60 will become apparent from the ensuing description.

The upper portions of the heating units 31 are interlocked with the shell 24 for proper positioning thereof. To this end the top panel 24a of the shell 24 having the bread receiving openings 26 and 27 therein is provided with depending flanges 24m and 24n surrounding each of the openings 26 and 27, as clearly shown in FIGS. 1, 2 and 3 of the drawings. The depending flanges 24m on the side edges of the openings 26 and 27 are received within the notches 49 of the heating units 31 thereby interlocking the shell 24 with the upper ends of the frames 50. The dependings flanges 24n at the ends of the bread receiving slots 26 and 27 (FIGS. 1 and 3) also engage the upper ends of the frame portions 50e thereby insuring proper positioning of these frame portions which function as bread carrier guides for the bread carriage or rack described hereinafter.

From the foregoing description it can be seen that the heating units 31 which form the opposite side walls of the toasting chambers 29 and 30 are simple in construction and are easily replaceable if needed. Moreover, the mica sheets 52 can easily be replaced on the frames 50 and the interlocking of the upper ends of the frames and the top panel 24a of shell 24 provide for simplicity of construction and assembly of the toaster and reduction of the cost.

In order to support bread slices within the toaster and to move such slices from a toasting to a nontoasting position and vice versa, there is provided a bread carriage mechanism 62 which is movable between an upper bread receiving position, as shown in FIGS. 2 and 3 of the drawings, and a lower toasting position, as shown in FIG. 8 of the drawings. In the latter figure, the bread slices are adapted to be disposed within the toasting chambers 29 and 30 with opposite sides of the bread slices facing the heating units 31 of each chamber. The carriage mechanism 62 includes a horizontally disposed bread supporting rack 63 formed with a single piece of sheet metal stamped into the desired form.

To perform a switch actuating function described in greater detail hereinafter, the end member 63d of rack 63 supports an insulating switch actuating member 66 (FIGS. 3 and 8). In a device built in accordance with the present invention, switch actuating member 66 was a T-shaped insulating member with the head of the T inserted and clamped within the channel defined by end frame 63d, which was of channel-shaped cross section. The leg of the T is a downwardly depending extension, as best shown in FIG. 3 of the drawings. Preferably, bend tabs, not shown, integrally formed with rack 63 hold the insulating switch actuating member 66 in assembled relationship.

For the purpose of guiding, moving and controlling the bread rack 63, the end member 63c is much more elaborate than the other portions defining the hollow rectangular bread rack. As best shown in FIGS. 2 and 3 of the drawings, the end member 63c comprises a sort of horizontal shelf portion from which there extends upwardly a vertical wall portion 63h terminating at the top in a horizontal projection 63i which is spaced in parallel relationship with the shelf portion 63c. The shelf portion 63c and the projection 63i are provided with aligned openings through which extends a carriage support post or elevator shaft 68. In a device built in accordance with the present invention, the upper and lower ends of the shaft or post 68 were of reduced cross section, and the lower end was inserted into an opening in base flange 28f and secured thereto by any suitable fastening means, such as 69 (FIGS. 2 and 3). The upper end of shaft or post 68 is disposed in an opening defined in a top plate 70 which is secured as by fastening means 71 (FIGS. 2 and 3) to the central heating units 31. Top plate 70 projects beyond the edges of these heating units in spaced parallel relationship with the portions 63c and 63i of the bread rack 63. The portions 63c and 63i of the rack 66 may be provided with integral sleeve portions designated as 63j (FIG. 3) surrounding the openings for the post 68 to guide the carriage in its vertical movement and to hold it in a nontilting manner.

For the purpose of supporting in a pivotal manner a suitable carriage latch, the bread rack 63 is provided with spaced vertically disposed projections 63k and 63m for supporting a horizontal pivot pin 73. In order to constantly bias the carriage or bread rack 63 to the upper or nontoasting position, there is provided a carriage return spring 74, which is illustrated as a tension spring having one end engaging a suitable opening in projection 63k and the other end engaging a suitable opening in top plate 70, as clearly shown in FIGS. 2 and 3 of the drawings. With this arrangement, the tension spring continually biases the carriage to the upper position shown in FIGS. 2 and 3 of the drawings.

To limit the maximum upward movement of the carriage under the force of carriage return spring 74, an integral projection 50j is struck from the flange portion 50e of inner heating unit 31 defining the toasting chamber 30 which, as clearly shown in FIG. 2 of the drawings, engages a shoulder 75 defined by the top edge of the vertical portion 63h. Thus, a member 50j is a stop member for limiting the upward movement of the bread rack 63.

In order to manually move the carrige to its toasting position and to terminate maually the toasting position at any time, there is provided a latching member 76 and a carriage moving and latch actuating member 77. The latching member 76, as best shown in FIG. 2 of the drawings, comprises a U-shaped portion 76a at its upper end and a depending latch portion 76b extending downwardly from the U-shaped portion 76a. The legs of the U-shaped portion 76a define hinge members for receiving the pivot pin 73 supported by the vertical projections 63k and 63m. To manually control the latching member 76, it is provided with an upwardly directed portion 76c to which is secured, by welding or in any other suitable way, the actuating member 77. This actuating member is adapted to extend through the vertical slot 35 in the end panel 22 described above so that the carriage may be actuated from the exterior of the housing of the toaster 20. Preferably, a knob 79 (FIG. 1) is secured to the free end of the actuating member 77. The depending portion 76b of the latching member 76 engages the horizontal shelf portion 63c so that with downward pressure on the knob 79 the actuating member 77 effectively becomes an integral extension of the carriage or bread rack 63, whereby with continued downward force applied to the knob 79 the carriage 63 will move toward the toasting position against the bias of the tension spring 74. In order to perform a latching function, as described hereinafter, the free end of latching member 76 is provided with an angularly disposed lateral projection 76d (as best shown in FIGS. 2 and 3 of the drawings) for cooperating with a suitable latch, described hereinafter. The lower end of latching member 76 acts as a stop to limit the maximum downward movement of bread rack 63. This is because the lower end of latching member 76 engages the horizontal flange 28f of base 28 upon maximum downward movement.

For the purpose of controlling the vertical movements of the bread rack 63, there is provided a conventional dash pot mechanism generally designated at 80. As illustrated, the dash pot comprises a cylinder 81 open at the upper end with the lower end secured to the flange 28f of base 28 (FIGS. 2 and 3). The conventional dash pot plunger 62, reciprocally movable within the cylinder 81, is connected to a plunger rod 83. As illustrated in the drawings, the plunger rod 83 extends through an opening in a projection 63o and the upper end of the plunger 83 is provided with an integral enlargement so that the rod 83 can move downwardly relative to the projection 63o only until the projections 63p engage the projection 63o. If desired, a coiled compression spring may be provided which surrounds the plunger rod 83 wherein the head or the projection is on the top end of the plunger rod 83 to engage either the projection 63o or a projection which is formed near the shoulder 75. This alternate embodiment is shown in detail in the aforementioned Jepson et al U.S. Pat. No. 3,361,053. To accommodate the plunger rod 83 and also the cylinder 91 when the latter is in its lowermost position, the shelf portion 63c is provided with a notch 86, as best shown in FIG. 2 of the drawings. It will be apparent that when the carriage is in its uppermost position shown in FIG. 3 of the drawings, the plunger 82 will have been pulled to its uppermost positon by virtue of the projections 63o being in engagement with projection 63o, the dash pot slowing down and steadying the motion of the carriage. Upon movement of the carriage, the projection 63o is free to move relative to the plunger 83.

Before considering the electrical circuit and control means for controlling the heating operation of the toaster 20, a brief description of a portion of the color control mechanism will be included here. To this end there is provided a color control cam 88 pivotally mounted to the lower end of carriage support post or elevator shaft 68. In a device built in accordance with the present invention, the cam 88 comprised an insulating cylindrical member, having a predetermined outer configuration, pivotally mounted about the vertical axis of post 68. In order to pivot cam 88 about this axis, there is provided an actuating lever 89 suitably secured to the upper end of the cam 88, as by being disposed within a groove 90 defined in the top of the cylindrical cam 88 (FIG. 2 of the drawings). Preferably, the end of lever 89 secured to cam 88 is also pivoted with an opening to receive the post 68. So that the lever 89 may be actuated from the exterior of the housing of the toaster 20, it projects through the horizontal slot 36 defined in end plate 22 and preferably also an actuating knob 91 (FIGS. 1 and 3) is secured to the end of lever 89.

For the purpose of latching the bread carriage or rack 63 in its lower or toasting position, there is provided a solenoid latch mechanism, generally designated at 92. This solenoid latch mechanism comprises a U-shaped support frame 93, the legs of which are provided with projections 93a (FIG. 2) which extend through openings in base flange 28f, thus suitably securing the support or mounting frame 93 thereto. The solenoid mechanism 92 includes the conventional solenoid winding 94 (FIG. 2) supported by frame 93 having axially movable armature 95. The latching portion of the armature 95, designated at 95a, is of a somewhat conical configuration and is adapted to engage the latching projection 76d of latching member 76. In order to bias the latching armature 95 into latching position, a suitable compression spring 96 is provided, interposed between a washer or flange 95B, secured to the armature 95 and one leg of the U-shaped frame 93, as clearly shown in FIG. 2 of the drawings. To limit the maximum movement of latching armature 95 toward the latching position, there is provided a stop 38i (FIG. 3) struck from the flange portion 28f and integrally formed therewith. It will be apparent that when the angularly disposed latching portion 76d engages the conical portion 95A of latching armature 95 upon downward movement of the carriage 63, it will cause the armature 95 to retract until the latching portion 95a thereof can move about the projection 76d, whereupon the carriage will be latched at its lowermost position. It will be readily apparent that upward movement of the knob 79 will move latching member 76 out of engagement with solenoid armature 95, whereupon the carriage 63 will move upwardly under the bias of the tension spring 74.

For the purpose of supplying electrical energy to the heating elements 53a and 53b and the solenoid winding 94, there is secured to the vertical portion 28e of base 28, as best shown in FIG. 3 of the drawings, an elongated insulating terminal box 97 formed of phenolic resin or the like. Suitable rivets preferably secure the terminal box to the base 28. The box 97 is designed with integral tubular sleeves 97a as shown in FIG. 8, to enclose the mounting rivets and to insure proper insulation thereof. Mounted within the terminal box 97 are a pair of identical toaster terminals designated as 100a and 100b. These toaster terminals are somewhat U-shaped and are secured in position by suitable rivets 101 (FIG. 3). The two conductors of the power cord 40, designated as 40a and 40b, are connected to the terminals 100a and 100b, respectively. These toaster terminals 100a and 100b each include at the top thereof a lateral projection supporting an upwardly directed stationary contact 102a and 102b, respectively (FIG. 2). The stationary contacts 102a and 102b are part of a pair of carriage controlled switches including the movable contacts 103a and 103b which are each mounted at an intermediate portion of an associated resilient switch arm 105a and 105b, respectively. These switch arms 105a and 105b extend along the top of box 97 and are each secured at their remote ends, as described hereinafter. The free ends of arms 105a and 105b extend toward each other and project into a central notch 106 defined in the top wall of the switch box 97 directly below the switch actuation projection 66. The arms 105a and 105b are resilient, and the free ends are inherently biased against the edges defining notch 106. Thus, when the carriage 63 is moved downwardly, the switch actuating member 66 engages the free ends of resilient switch arms 105a and 105b and moves the contacts 103a and 103b into engagement with associated contacts 102a and 102b, respectively, or, in other words, closes a pair of carriage controlled switches.

The ends of the resilient arms 105a and 105b are spot welded or otherwise electrically connected to the securing projections 107b. The terminal 57a for the heating element 53a of the insulated heating sheet 52 which is positioned adjacent to the projection 107e is also spot welded or otherwise electrically connected to the left-hand projection 107b. To connect the heating elements 53a and 53b in the desired electrical relationship, the remaining terminals 57a, 57b, 57c and 57d of the heating units 31 are interconnected by insulated conductors 112, as shown in the schematic diagram of FIG. 9 of the drawings. It will be apparent that with this arrangement when the carriage controlled switches 102a, 103a and 102b, 103b are closed, current will flow through either the heating element 53a or through both of the heating elements 53a and 53b. When the switch 104 is open, current will flow through both the heating elements 53a and 53b, as is suitable for the heating of convenience foods. When the switch 104 is closed, the resistance elements 53b are shorted out and a greater wattage is utilized by the toaster as is suitable for the toasting of bread or the like.

In order to make sure that the insulated conductors 112 do not interfere with the carriage mechanism 62, the upper ends of the carriage guide flanges 50e are preferably provided with integral finger members 50k, best shown in FIGS. 2 and 3 of the drawings, whereby these insulated conductors may be disposed in the pocket provided by these fingers 50k and the remainder of the upper portion of the flanges 50e. The terminals 57d and 57b are positioned very close to one another, and, in order to provide for insulation between the terminals 57d and 57b, a generally rectangular insulating element 107 which is formed out of a sheet such as mica is positioned over the ends of the terminals 57d and 57b and behind the ends of the connectors 112 of which are spot welded to the terminals 57d and 57b. The insulator 107 has two generally rectangular holes with an insulating space therebetween in order to provide insulation between the terminals 57d and 57b.

From the above description, it will be apparent that if the power cord 40 is plugged into a source of electrical energy, the heating elements 53a or 53a and 53b will be energized, in accordance with the position of the switch 104, whenever the switches 102a–103a and 102b–103b are closed, which, of course, will be whenever the carriage is moved to its toasting position. The corresponding heating elements 53a or 53a and 53b will be de-energized whenever the carriage is moved out of its toasting position.

In order to automatically energize the solenoid winding 94 to terminate a toasting operation, winding 94 of the solenoid latch mechanism 92 is connected across the power source when switches 102a–103a and 102b–102b are closed and a switch controlled in response to the condition of the bread slice being toasted is closed. Specifically, there is provided a conductor 114 which interconnects one end of the solenoid winding 94 with one of the arms 105a, 105b and the conductors 115 and 116 which interconnect the other of the arms 105a, 105b with the other end of the solenoid winding 94 through the contacts 117a and 117b of switch 117, the operation of which is described in detail hereinafter.

As disclosed in Koci U.S. Pat. No. 2,667,828, granted Feb. 2, 1954 and assigned to the same assignee as the present application, a very satisfactory way to determine the toasting interval so that uniform toasting of a plurality of bread slices during successive toasting cycles of the toaster is obtained is to employ a device responsive to the surface temperature of the bread slice being toasted. With this arrangement, a uniform degree of toasting is obtained under any and all operating conditions regardless of the type of bread, the degree of dryness or similar factors. The toaster disclosed in the above Koci patent has been extensively sold and has proven to be very satisfactory. The switch 117 controlling the solenoid latch mechanism 92 is, in turn, controlled by a surface temperature responsive thermostat and color control assembly, generally shown at 118 of FIG. 6 of the drawings. The contacts 117a and 117b of the switch 117 form a part of this subassembly. As best shown in the drawings, this subassembly comprises a somewhat L-shaped thermostat bracket 119 having a normally disposed vertical portion 119a for location in the toasting chamber 30, as best shown in FIG. 3 of the drawings. Thermostat bracket 119 also includes a portion 119b normally disposed in a horizontal plane adapted to be fastened to the underside of the center or inner heating unit support 28b by a single screw or fastening means, which extends through an opening 121 in the bracket 119. In this manner, the entire subassembly 118 is secured in position in the toaster 20 by this single screw. The projecting finger 119c of the bracket 119 is receivable in a notch in one of the downturned edges of the base portion 28b.

For the purpose of supporting the contacts 117a and 117b of the latch control switch 117 in insulated relationship as a part of subassembly 118, there is provided an insulating support 123, preferably formed of procelain or other insulating material which will withstand the relatively high heat to which it is subjected. Insulator support 123 is secured by means of a rivet 124 to the portion 119b of the thermostat bracket 119. So that this single rivet 124 may secure the insulator support 123 to the bracket 119 in a nonrotative manner, the insulator support 123 is provided with a projection 123a engaging a portion of the edge of support bracket 119b. Additionally, the support bracket is provided with deformed fingers 119b which engage an edge of insulating support 123.

It will be understood that energy radiated from the surface of a bread slice being toasted is relatively small. Also, inasmuch as the thermoresponsive device described embodies a constrained bimetallic configuration, the resultant output motion and energy are quite small. In view of this, the movable contact 117b is in the form of a small diameter wire, of suitable contact material, in order to minimize contact area and maximize contact pressure. In a device built in accordance with the present invention, contact 117b comprised an erosion resistant conductor wire welded to a short leg 126a of a very resilient L-shaped switch arm 126. The contact 117b is on the free end of this resilient switch arm, the other end of which is spot welded to an L-shaped conductor 128, one arm of the L being disposed within a recess 129 defined in insulating support 123 and secured thereto by a suitable rivet 130. The conductor 115 (FIG. 9) interconnecting the switch 117 and the connector arm which is connected to the switch 102b–103b is suitably spot welded to the other end of the L-shaped conductor 128.

The contact 117a of the switch 117 might be referred to as the stationary contact, although it is movable for color control purposes described hereinafter. It is mounted on a switch supporting arm 132 which is much less flexible than the switch arm 126, but disposed in spaced parallel relationship therewith. The contact 117a is supported on the free end of switch arm 132. The other end thereof is provided with a lateral projection 132a disposed in a recess 133 in insulating support 123 and also held in this recess by a suitable rivet 135. The conductor 116, as best shown in FIG. 9 of the drawings, is spot welded to the fixed end of switch arm 132. The inherent resilience of the switch arm 132 is such as to tend to move away from the contact 117b, while the switch arm 126 tends to assume a position spaced apart from the contact 117a but readily movable with a small force so contact 117b may engage contact 117a. So that the conductor 116 does not interfere with carriage mechanism 62, the former is held against base portion 28f by a finger integral with this base portion.

To selectively position the stationary contact 117a for color control purposes, there is provided a color control arm 136 which has an intermediate portion thereof pivotally supported to the thermostat bracket 119. As best shown in FIG. 6 of the drawings, the thermostat bracket 119 includes a depending portion 119e. A resilient sheet spring member 137 is spot welded to the portion 119e and to an intermediate portion of color control arm 136. The end of color control arm 136 adjacent stationary contact 117a is provided with calibration means comprising an adjusting screw 138 threadedly engaging a tapped opening in color control bar 136. A tension nut 139 is also provided to make sure that any selected adjustment remains fixed. Mounted on the end of adjusting screw 138 is an insulating member 140 adapted to engage the free end of switch arm 132 on the opposite side thereof from that to which the stationary contact 117a is secured. When the subassembly 118 is mounted on the toaster 20, a projection 136a of the color control arm 136 extends through an opening 142 (FIG. 2) in portion 28d of the base 28 into close proximity with the color control cam 88. Preferably, the end of limit portion 136a is provided with a cam follower 136b (FIG. 4) so that rotation of the cam 88, which has a noncylindrical configuration, will cause movement of relatively rigid control bar 136 about its pivoted connection 137 with thermostat bracket 119.

From the above description, the purpose of the notch 60 described above, provided on the base portion 28b and in the lower frame 50b, becomes apparent since it permits the vertical supporting portion 119a of bracket 119 to extend upwardly within the toasting chamber 30 between two of the bread guides 50c and spaced from a bread slice disposed in this toasting chamber. When the subassembly is secured in position by the single mounting screw, the vertical support portion 119a of bracket 119 is orientated with the narrow edge thereof toward the bread slice disposed in toasting chamber 30 on the one side, and the heating element 53a of the associated heating unit 31 on the other side. With this arrangement, the support 119a will shade a minimum portion of the bread surface from the heating element. The portion 119b is disposed in good heat conducting relationship with the base portion 28b whereby this base portion serves to dissipate heat transmitted to the bracket 119 from the heating element adjacent thereto in the toasting chamber 30 as well as from other heat sources.

A surface responsive member is secured to the upper end of the bracket 119. As illustrated, a bimetallic element 145 in the form of an elongated strip has the lower end thereof secured to the upper end of bracket 119 with the wide portion of the strip disposed essentially parallel to a bread slice disposed in the toasting chamber 30. The high expansion side of the bimetal 145 is disposed toward the bread slice, and the upper portion 145a of the bimetal might be characterized as the control or switch actuating portion, while the lower portion 145b is the compensating portion. The bottom of the compensating portion 145b is firmly secured to the rigid thermostat bracket 119, preferably by a combined staking and welding operation. To also secure the upper end of the bimetal 145 and to shield the same against direct radiation, there is provided a shielding and support strip 147 which has its lower end firmly secured as by a staking and welding operation, designated at 148 to the upper end of thermostat bracket 119. The upper end of the shield 147 is welded to the upper end of the bimetal 145. So that the elements 145 and 147 are disposed in generally spaced parallel relationship, the upper end of the bimetal is provided with an L-shaped extension 145c, one leg of this L-shaped extension being welded to the shield 147. In a device built in accordance with the disclosed embodiment, the shield 147 was at least as wide as the bimetal 145 and was made of stainless steel. For the desired compensating action, the compensating portion 145b of the bimetal 145 is narrowed somewhat, the particular amount of which is determined experimentally. If the compensating portion 145b is too wide, overcompensation is obtained; and if it is too narrow, undercompensation is obtained. If desired, the face of the portion 145a of the bimetal exposed to the bread slice may be blackened to increase the absorption of radiant energy.

The central portion of the bimetal 145 is connected to an L-shaped switch operating and motion multiplying member 150, the lower end of which is connected to an insulating member 151 adapted to engage resilient switch arm 126 when deflected in one direction to cause closing of the switch 117.

With the subassembly 118 embodied in the toaster 20, upon energization of the heating elements 53a with a bread slice disposed in toasting position in toasting chamber 30, radiant energy from the surfaces of the bread slice will be transmitted to the bimetal 145. When the heating elements 53a and 53b are both energized and a convenience food slice is disposed in toasting position in toasting chamber 30, radiant energy from the surface of the convenience food slice will be transmitted to the bimetal 145. If more heat is applied to the portion 145a than to the portion 145b, the bimetal 145 will tend to assume a shallow S-shaped form with the blackened surface described above defining the convex portion of the S, as viewed from the side, and the compensating portion forming the concave portion of the S. Such movement will cause the motion multiplying switch arm 150 to close the switch 117. If more heat were applied to the portion 145b than to portion 145a, the bimetal 145 will again assume a shallow S-shaped form but reversed with respect to that described above so as to move arm 150 in a nonswitch closing direction. This can be demonstrated by applying heat from a lighted match to the portion 145a resulting in almost instant closing of switch 117. On the other hand, if one applied heat in the same manner to the portion 145b, the switch actuator 150 would move in a direction opposite to that necessary to close the switch. The theory of operation of the bimetal 145 is similar to that disclosed in Koci Pat. Nos. 2,390,947 and 2,390,948, both granted Dec. 11, 1945, and assigned to the same assignee as the present application, with particular reference to those embodiments disclosed in these Koci patents where the bimetal is secured at both ends. Although a relatively small motion occurs at the junction between the bimetal portions 145a and 145b to which the switch actuating arm 150 is secured, this motion will be greatly multiplied by virtue of the length of the actuator 150 and substantial movement will occur at the lower end thereof.

Figure 1:
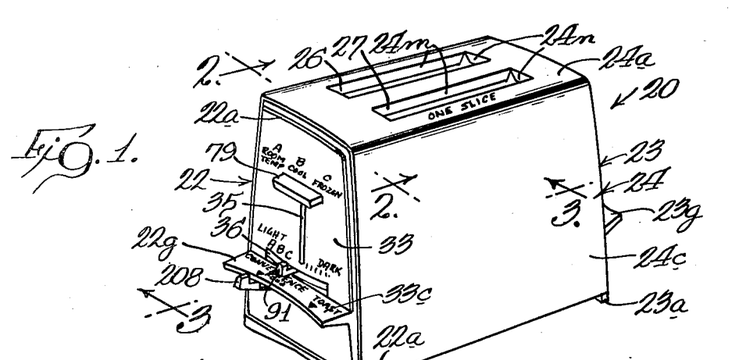
FIG. 1 is a perspective view of a new and improved toaster constructed in accordance with the features of the present invention with the carriage in its upper or non-toasting position.

It will be apparent that the termination of the toasting cycle will be controlled only from the toasting chamber 30, and if a single slice of bread or slice of convenience food is to be toasted, it should be placed in this toasting chamber. It is for this reason that the panel 24a of the shell 24 is provided with the indicia "ONE SLICE" adjacent the bread slot 27, as shown in FIG. 1 of the drawings.

In order that successive slices of bread or slices of convenience foods may be toasted in the toaster 20, means for rapidly cooling the portion of bimetal 145a are preferably provided. The means for rapidly cooling the bimetal 145 are described in detail in the aforementioned Jepson et al U.S. Pat. No. 3,361,053. The means for rapidly cooling the bimetal 145 includes a heat conducting member 152 which moves with the rack 63 and slides along the portion 119a of the bracket 119 and along the bimetal 145 in good heat conducting engagement therewith. When the carriage is in the upper or bread receiving position, this heat conducting member 152 is in engagement with the portion 145a of the bimetal 145 and rapidly conducts this heat stored in the bimetal to the bread rack 63 thereby cooling portion 145a of the bimetal. When the carriage is in its lower or toasting position, the conductor 152 is in contact with the bracket 119a.

When the toaster is manufactured, the color control mechanism is calibrated by properly adjusting the screw 138, and then the operator may selectively adjust the desired toast color by manipulating the knob 91. Upon inserting bread slices into the bread receiving slots 26 and 27, the operator can move the same to the toasting position by merely depressing the knob 79 until it is latched in its lower position. This action will cause the carriage controlled switches 102a-103a and 102b-103b to close by virtue of the projection 66 on the carriage or bread rack 63. This will energize the heating elements 53a or 53a and 53b in accordance with whether or not the switch 104 is closed or opened. When the desired toasting or heating is accomplished, the bimetal 145 will cause actuation of the switch 117 to the closed position thereby energizing solenoid latch mechanism 92 releasing the carriage, which opens the switches and deenergizes the heating elements. Quick cooling of the bimetal 145 occurs by virtue of the resilient conductor 152 which moves into engagement therewith so that the toaster is immediately ready for toasting successive bread slices. By virtue of the compensating portion 145b of the bimetal 145 as the ambient temperature in the toaster increases, the toasting interval decreases, but uniform toasting, regardless of the ambient temperature, is obtained.

Figure 4:
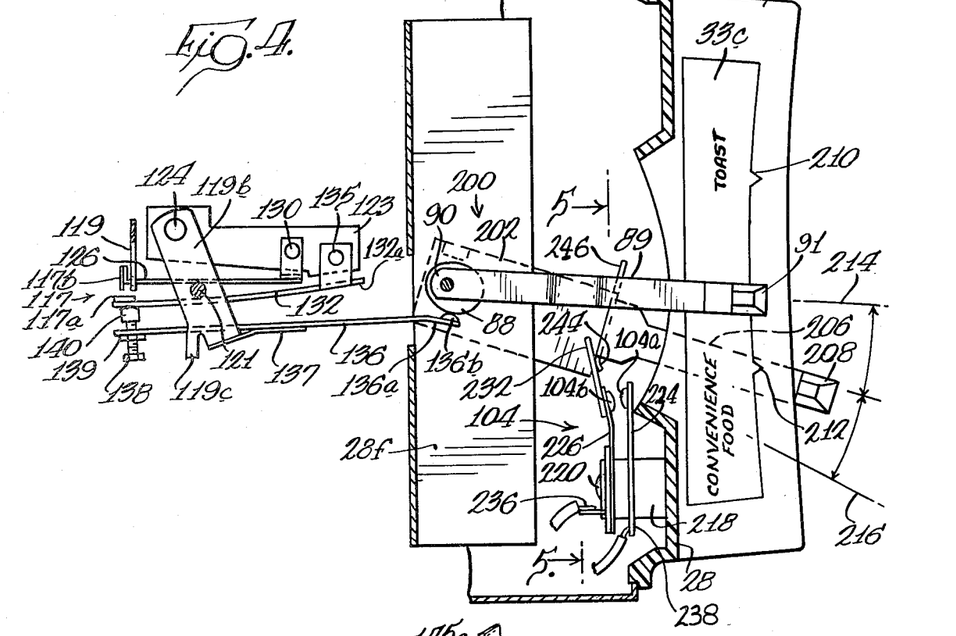
FIG. 4 is a fragmentary sectional view taken along the line 4—4 of FIG. 3 which illustrates both the toasting range control means and the control means for convenience foods.
Figures 5, 6:
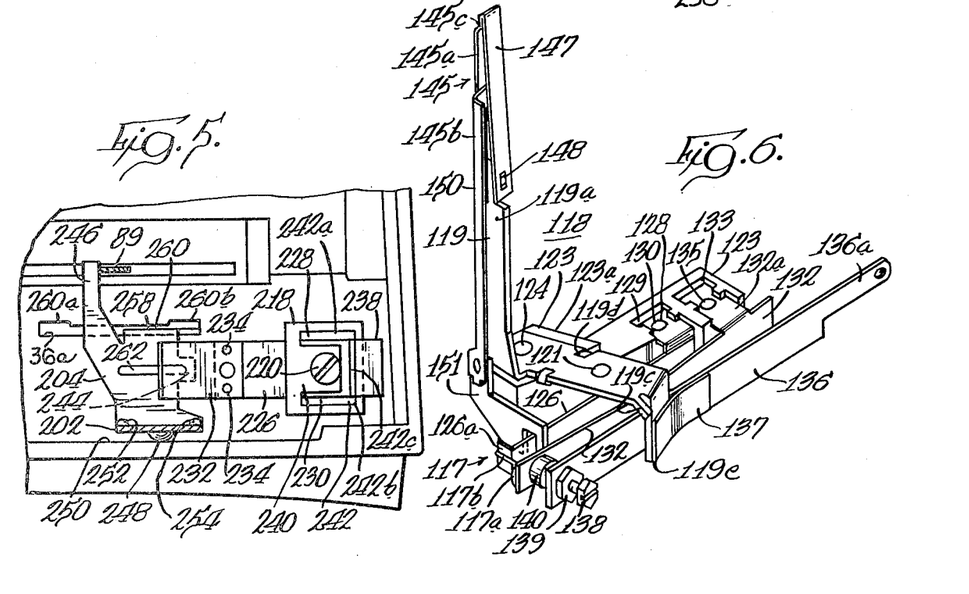
FIG. 5 is a fragmentary sectional view taken along the line 5—5 of FIG. 4 which shows a portion of the convenience food control mechanism and wattage control switch of the toaster.
FIG. 6 is an enlarged detailed perspective view of the thermostatic toasting range control unit of the toaster of FIG. 1.

A plan view of the previously described thermostatic control unit consisting of the control level 89 and its associated actuating knob 91 is depicted in FIG. 4. Horizontal movement of the control lever 89 by manipulation of the knob 91 causes rotation of the cam 88 which, in turn, controls the setting of the toaster control assembly by positioning of the color arm 136 by the cam follower 136b. The color control cam 88, which is pivotally mounted to the lower end of carriage support post or elevator shaft 68, is comprised of an insulating cylindrical member having a predetermined outer configuration. In order to pivot cam 88 upon its axis, the actuating lever 89 is suitably secured to the upper end of the cam 88, as by being disposed within a groove 90 defined in the top of the cylindrical cam 88 (FIG. 4).

As previously described, in connection with FIG. 9, when bread is to be toasted in the toaster, it is desirable for the switch 104 to be closed so that the resistance elements 53b are shorted out, thereby increasing the power utilized by the heating elements 53a. In addition, it is desirable when toasting bread to be able to vary the toasting control mechanism through its entire range from "LIGHT" to "DARK" by operation of the color control lever 89 through the actuating knob 91. When convenience foods are to be toasted in the toaster, the contacts 104a and 104b of the switch 104 are opened so that the increased resistance of the heating elements 53b are added in series with the corresponding heating elements 53a (FIG. 9). In this manner, the current that flows through the heating elements of the toaster is reduced resulting in a lower power utilization by the toaster. Because of the reduced heating capacity of the toaster, the range over which the actuating knob 91 may adjust the color control lever 89 is limited so that it is effective only over approximately ½ of the total adjustment range that is employed when bread is being toasted. It is preferred that this adjustment range be from the "LIGHT" marker to approximately midway between the "LIGHT" and the "DARK" markings on the escutcheon plate 33.

The manner in which this is achieved is through the convenience food control mechanism 200 which consists of a stamped piece of metal which has a generally rectangular flat base surface 202, a vertical portion 204 extending upwardly from the base 202 and two outwardly extending projections 244, 246 thereon, one of which 244 is employed to open the switch contacts 104a and 104b and the other of which 246 is employed to restrain the movement of the control lever 89. The control mechanism 200 has an outwardly extending lever arm 206 which projects through a slot 208 below the handle 22g. By placing the lever arm 206 below the handle 22g and the lever arm 89 above the handle 22g, the ease of operation of the toaster is greatly facilitated, and, if the toaster is primarily used for the toasting of bread, the convenience food control mechanism 200 is out of the way and does not interfere with the normal adjustment of the toasting mechanism of the toaster. The actuating knob 208 is connected to the end of the convenience food control shaft 206 so that this lever may be positioned under either the "TOAST" portion of the escutcheon plate 33c or under the "CONVENIENCE FOOD" portion of the escutcheon plate 33c. When the toaster is being used to toast bread, the control mechanism 200 is positioned so that the control knob 208 is in alignment with the indicating point 210 of the escutcheon plate 33c. When convenience foods are being toasted, the control knob should be in alignment with the indicating point 212, as shown in FIG. 4. When the indicating knob 208 is positioned in alignment with the indicating point 210, the control lever 89 may be adjusted over the entire range, and the switch 104 will be closed. When the indicating knob 208 is in alignment with the point 212, the switch 104 will be open, and the control lever 89 will be adjustable only over a more limited range as the range shown between the lines 214 and 216 of FIG. 4.

In order to provide sufficient support for the switch 104 and to place it in close proximity to the operating control mechanism 200, it is mounted on the lower inside portion of the end panel 22, as shown in FIG. 3. The end panel 22 has an upwardly extending boss 218 which has a hole therein that is tapped for receiving a securing screw 220. An I-shaped insulator 222 is secured to the boss 218, and two contact arms 224 and 226 of the switch 104 pass between the ends 228 and 230 of the insulator 222. The metallic contact arm 224 which has the contact 104a on its end is relatively rigid and is thus secured between the boss 218 and the inside portion of the I-shaped insulator 222 while the flat resilient arm 226 is positioned adjacent the outside portion of the I-shaped insulator 222. The contact plate 226 which has the contact 104b at its end is formed of much thinner metal and is quite flexible. A fairly rigid insulating member 232, made of a material such as silicone glass laminate or fiberboard, is secured by means of rivets 234 to the end of the flexible metal arm 226. The member 232 is the portion of the switch 104 which is engaged for activation by the projection 244 of the control mechanism 200. The contact arm 226 has an outwardly projecting extension 236 to which connection to the associated conducting lead 112 may be made by welding. The rigid contact arm 224 has portion 238, which extends beyond the boss 218, to which connection may be made by welding or by other appropriate means.

The flexible contact arm 226 is held in place against the I-shaped insulator 222 by means of a rectangular rigid metallic holder 240 which has a generally C-shaped slot 242 cut therein. The upper portion 228 of the I-shaped insulator 222 extends through the upper portion of the slot 242a while the lower part 230 of the I-shaped insulator extends through the lower portion 242b of the slot 242. The outwardly extending connecting tab 236 projects through the vertical section 242c of the slot. The described switch 104, therefore, is relatively inexpensive but is very securely bounded to the end panel 22 so that many trouble-free switching operations may be provided by the switch 104.

For the purpose of opening the contacts 104a and 104b of the switch 104 when the control knob 208 is moved into alignment with the point 212 of the escutcheon plate 33c, the control mechanism 200 is provided with a horizontally extending projection 244 (FIGS. 4 and 5) which is brought into contact with the extension 232 so as to impose a force on the contact arm 226 which causes it to move the contact 104a away from the contact 104b thereby breaking the short circuited connection across the heating elements 53b. The vertical portion 204 of the control mechanism 200 also has an upwardly extending projection 246 which in FIG. 5 is shown to the left of the control lever 89, and in FIG. 4 is shown towards the "TOAST" side of the escutcheon plate 33c. When the adjustment knob 208 is in alignment with the point 212, its position is that shown in FIG. 4 where the upwardly extending projection 246 is in engagement with the lever 89 so that movement of the lever 89 through pressure on the control knob 91 may be restrained sufficiently so that the operator, while being able to adjust the control lever 89 over the range between the lines 214 and 216, will not inadvertently force the lever past the line 214 since a considerably greater force is needed to do this than is needed to adjust the control lever 89. The base 202 of the control mechanism 200 is provided with a hemispherically-shaped indention 248 which extends downwardly into engagement with the inner surface 250 of the inwardly directed support flange 22c. The base 202 also has integrally semicircular-shaped metal loops 252 and 254 therein so as to extend upwardly from the base 202. The purpose of the loops 252 and 254 is to provide a low friction positive engagement with the surface of the outwardly extending support flange 28f of the base member 28.

For the purpose of locking the control mechanism into place whenever the lever 206 is positioned over the "TOAST" point 210 or the "CONVENIENCE FOOD" point 212, the slot 36a is provided with notches 260a and 260b at the ends of the surface 260. The control mechanism 200 has an elongated bearing indention 262 on the vertical portion 204 and another elongated bearing indention 258 on the lever portion 206 which is normal to the bearing indention 262. When the lever 206 is in the "TOAST" position, the bearing indention 258 is inserted into the notch 260a to restrain movement of the lever 206. If the lever is slightly depressed and slid towards the "CONVENIENCE FOOD" position, the bearing indention 258 slides on the depending surface 260 until the position is reached when the bearing indention 258 snaps into the notch 260b. The inner portion of the lever 206 is bent upwardly at a slightly greater angle to bias the bearing indention 258 against the surface 260 of the slot 238 so that the bearing indention 258 is biased toward the notches 260a and 260b. The outer portion of the lever 206 is bent upwardly at a somewhat greater angle than is the inner portion so as to keep knob 208 close to handle 22g. The bearing indention 262 engages the insulating board 232 of the contact arm 226 as soon as the lever 206 moves over any part of the "CONVENIENCE FOOD" area of the escutcheon plate 33c thereby providing for opening of the switch contacts 104a and 104b even before the projection 244 engages insulating board 232 so as to space the contacts 104a and 104b far apart when the lever 206 is latched in the "CONVENIENCE FOOD" position. This insures that the power level of the toaster is reduced for convenience foods even if the operator inadvertently fails to move the lever 206 to its preferred latching position over the indicating point 212.

While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. An electric toaster for receiving slices of food therein comprising control means for reducing the power utilized by said toaster from a first power level to a second lower power level, heating means constructed for providing substantially uniform heating of said slices of food for both of said power levels and adjustment means for adjusting the energy utilized by said heating means over an adjustment range to deliver a greater or lesser amount of energy to said food slices at either of said power levels; said control means being interconnected with said adjustment means to restrict said adjustment range when said power level is reduced to said second lower power level to a portion of said range for delivering a lesser amount of energy to said food slices as compared to the entire adjustment range available when said toaster is operated at said first power level, the interconnection between said control means and said adjustment means causing said adjustment means to be moved from a position on said energy range for delivering a greater amount of energy to a portion of said energy range for delivering a lesser amount of energy when said control means is moved from said first power level to said second lower power level.

2. The electric toaster of claim 1 wherein said adjustment means is responsive to radiant energy from a food object in said toaster and said heating means and control means provide a lower ratio of radiant heat energy to convection heat energy when the power level of said heating means is reduced to said second power level.

3. An electric toaster for receiving slices of food therein comprising control means for reducing the power utilized by said toaster from a first power level to a second lower power level, heating means constructed for providing substantially uniform heating of said slices of food for both of said power levels and adjustment means for adjusting the energy utilized by said heating means over an adjustment range at either of said power levels; said control means being interconnected with said adjustment means to restrict said adjustment range when said power level is reduced to said second lower power level from the adjustment range available when said toaster is operated at said first higher power level, the heating means comprises at least one heating element associated with each of said food slices comprising an insulating sheet positioned adjacent to a food slice when said slice is inserted into said toaster in a vertical direction through a slot in said toaster, said sheet having a first side facing said adjacent food slice and a second side facing away from said adjacent food slice, a first electrically resistive heating wire wound in a horizontal direction across said first side of said sheet in parallel rows and having a decreasing spacing between adjacent rows as the wire approaches the bottom of said sheet, a second electrically resistive heating wire wound across said second side of said sheet in a plurality of vertical columns and a plurality of oblique columns such that said vertical and oblique columns are positioned closer to each other at the bottom of said sheet than they are at 25 the top of said sheet and said control means comprises means for either selectively activating said first heating wire only or for connecting said first and said second heating wires in a series circuit and for activating said series circuit.

4. The electric toaster of claim 3 wherein said adjustment means is responsive to radiant energy from a food object in said toaster and said heating means and said control means provide a lower ratio of radiant heat energy to convection heat energy when the power level of said heating means is reduced to said second power level.

5. An electric toaster for receiving slices of food therein comprising adjustment means operable over an adjustment range, switch means, first electrical heating means coupled to a source of electrical power and to said adjustment means, second electrical heating means coupled in series with said first heating means and in parallel with said switch means so as to be shorted by said switch means when said switch means is closed, control means for opening said switch means, means interconnecting said adjustment means and said control means for limiting the adjustment range of said adjustment means when the power level of said heating elements is reduced from a first higher power level to a second lower power level by the opening of said switch means, said adjustment means being responsive to radiant energy from a food object in said toaster and said heating means and said control means providing a lower ratio of radiant heat energy to convection heat energy when the power level of said heating means is reduced to said second power level, an insulating sheet associated with one side of each of said food slices when said slices are inserted into said toaster in a vertical direction through slots in said toaster, each of said sheets having a first side facing a food slice and a second side facing away from said food slice; said first heating means comprising a first electrically resistive wire wound in a horizontal direction across said first side of said sheet in parallel rows having a decreasing spacing between adjacent rows as the wire approaches the bottom of said sheet and said second heating means comprising a second electrically resistive wire wound across said second side of said sheet in a plurality of vertical columns and a plurality of oblique columns such that said vertical and oblique columns are positioned closer to each other at the bottom of said sheet than they are at the top of said sheet.

6. The electric toaster of claim 5 wherein said adjustment means is responsive to radiant energy from a food object in said toaster and said heating means and said control means provide a lower ratio of radiant heat energy to convection heat energy when the power level of said heating means is reduced to said second power level.

7. An electric toaster comprising a housing, at least one slot in the top of said housing for receiving a slice of food that is inserted in a vertical direction into said toaster, at least one heating element associated with each of said food slices comprising an insulating sheet positioned adjacent to its associated food slice when said food slice is received in its associated slot, said sheet having a first side facing its associated food slice and a second side facing away from said associated food slice, a first electrically resistive heating wire wound in a horizontal direction across said first side of said sheet in parallel rows and having a decreasing spacing between adjacent rows as the wire approaches the bottom of said sheet, a second electrically resistive heating wire wound across said second side of said sheet in a plurality of vertical columns and a plurality of oblique columns such that said vertical and oblique columns are positioned closer to each other at the bottom of said sheet than they are at the top of said sheet and control means for either selectively activating said first heating wire only or for connecting said first and said second heating wires in a series circuit and for activating said series circuit.

8. An electric toaster for receiving food slices therein comprising a housing having two end panels and an upper surface, said upper surface of said housing having at least one horizontally disposed slot for receiving a food slice oriented in a vertical direction therein, carriage means in said housing for lowering and raising said received food slice in said toaster, heating means for heating said food slice and power reduction means for reducing the power level of said heating means from a first power level to a second power level, one of said end panels having first, second and third end panel slots therein and a handle portion extending horizontally therefrom, said toaster further comprising carriage control means for controlling said carriage means comprising first activating means extending outwardly through said first end panel slot, adjustment means for adjusting the energy utilized by said heating means over an adjustment range associated with said first power level comprising second activating means extending outwardly through said second end panel slot and control means for reducing the power level of said heating means to a second power level and for limiting the adjustment of said adjustment means to a reduced adjustment range comprising third activating means extending outwardly through said third end panel slot; said first end panel slot being a vertically disposed slot, said second end panel slot being transversely disposed with respect to said first end panel slot and positioned above said handle portion and said third end panel slot being disposed parallel with respect to said second end panel slot and positioned below said handle portion.

9. An electric toaster for receiving food slices therein comprising a housing having two end panels and an upper surface, said upper surface of said housing having at least one horizontally disposed slot for receiving a food slice oriented in a vertical direction therein, carriage means in said housing for lowering and raising said received food slice in said toaster, heating means for heating said food slice and power reduction means for reducing the power level of said heating means from a first power level to a second power level, one of said end panels having first, second and third end panel slots therein and a handle portion extending horizontally therefrom, said toaster further comprising carriage control means for controlling said carriage means comprising first activating means extending outwardly through said first end panel slot, adjustment means for adjusting the energy utilized by said heating means over an adjustment range associated with said first power level comprising second activating means extending outwardly through said second end panel slot, control means for reducing the power level of said heating means to a second power level and for limiting the adjustment of said adjustment means to a reduced adjustment range comprising third activating means extending outwardly through said third end panel slot; said first end panel slot being a vertically disposed slot, said second end panel slot being transversely disposed with respect to said first end panel slot and positioned above said handle portion and said third end panel slot being disposed parallel with respect to said second end panel slot and positioned below said handle portion, said second activating means comprising a lever arm which extends outwardly through said second end panel slot, said adjustment means being constructed so that the movement of said lever arm in said second end panel slot adjusts the power being utilized by said heating means, said control means comprising an electrical switch means mounted inside said housing and having an activating member for activating operation of said switch means for reducing the power level of said heating means and said third activating means comprising a first extending projecting portion which is selectively positionable so as to restrict the movement of said lever arm in said second end panel slot over a predetermined portion of the length of said second end panel slot so as to restrict adjustment of the energy range of said heating means and a second projection for engaging said activating member of said electrical switch means so as to activate said switch means for reducing the power level of said heating means from said first power level to said second power level when the movement of said lever arm is limited by said first projecting portion of said third activating means over a predetermined portion of said second end panel slot.

10. The toaster of claim 9 wherein said carriage mechanism comprises a vertical shaft, and said lever arm and said third activating means are pivotally movable about the axis of said vertical shaft in a horizontal plane.

11. An electric toaster for receiving slices of food therein comprising control means for reducing the power utilized by said toaster from a first power level to a second lower power level, heating means constructed for providing substantially uniform heating of said slices of food for both of said power levels and adjustment means for adjusting the energy utilized by said heating means over an adjustment range at either of said power levels; said control means being interconnected with said adjustment means to restrict said adjustment range when said power level is reduced to said second lower power level from the adjustment range available when said toaster is operated at said first higher power level, said adjustment means includes a first lever pivotal through a predetermined angle when said control means is operated at said first higher power level, said control means including a second lever pivotally mounted coaxially with said first lever and movable between a first position for said first power level and a second position for said second power level, said second lever in said second position reducing said power to said second lower power level, said second lever in said second position having means limiting movement of said first lever to movement through only a portion of said predetermined angle.

* * * * *